United States Patent
Puniello et al.

(10) Patent No.: US 7,135,136 B2
(45) Date of Patent: Nov. 14, 2006

(54) GOLF BALL MANUFACTURING METHOD

(75) Inventors: Paul A. Puniello, Bristol, RI (US); Christopher Cavallaro, Lakeville, MA (US)

(73) Assignee: Acushnet Company, Fairhaven, MA (US)

( * ) Notice: Subject to any disclaimer, the term of this patent is extended or adjusted under 35 U.S.C. 154(b) by 230 days.

(21) Appl. No.: 10/688,982

(22) Filed: Oct. 21, 2003

(65) Prior Publication Data

US 2005/0082715 A1    Apr. 21, 2005

(51) Int. Cl.
*B29C 45/14* (2006.01)
(52) U.S. Cl. .............. 264/250; 264/279.1; 264/348
(58) Field of Classification Search ............ 264/348, 264/279.1, 250
See application file for complete search history.

(56) References Cited

U.S. PATENT DOCUMENTS

2002/0061790 A1 * 5/2002 Cavallaro et al. .......... 473/351

* cited by examiner

*Primary Examiner*—Edmund H. Lee
(74) *Attorney, Agent, or Firm*—Bingham McCutchen LLP (57) ABSTRACT

A method for reliably forming golf balls using solid cores is described. The method includes using a freezing apparatus to freeze a core. The core may be frozen at any desired temperature, for any desired duration. The time and duration may be chosen in order to achieve a desired size or effective modulus. When a core is sufficiently frozen, it may be placed in a molding apparatus. In order to minimize condensation or frost that may form on a frozen core, a dehumidifying method or apparatus may be included and a layer is preferably molded around the core soon after it is removed from the freezing apparatus.

14 Claims, 4 Drawing Sheets

GOLF BALL MANUFACTURING METHOD

FIELD OF THE INVENTION

The present invention relates to golf ball cores. More specifically, the present invention relates to a method for injection molding golf balls using frozen cores.

BACKGROUND OF THE INVENTION

Golf ball manufacturers are continuously changing and improving golf ball design such as by improving overall ball construction or by developing better materials for one or more layers of the ball. At one time, for instance, many manufacturers made golf balls with liquid-filled cores surrounded by elastic windings. This construction was preferred by advanced golfers who wanted a soft feel from the ball.

At the time, golf balls having a solid core construction were often perceived to be inferior at least because of the hard feel of the ball when struck by a club. Softer core materials were available to provide a softer feel, but only at the expense of lowering the coefficient of restitution (COR) of the core. As the COR of a golf ball decreases, the distance a ball travels likewise decreases. Thus, wound golf balls remained a popular ball construction until improvements in solid core materials.

More recently, however, there have been many advancements in solid core design that have played a part in the growing trend toward making solid core golf balls. For example, new developments in core materials have resulted in the ability to make solid cores with lower compression values so that they feel softer when struck with a club while reducing or eliminating the loss of COR previously seen in lower compression core materials.

Typically, solid core layers are made of highly resilient, elastic material, such as polybutadiene. As discussed above, conventional solid core compositions typically resulted in the core having a high compression, which made the ball feel hard when struck by a club. In fact, a high compression core is less likely to deform or deflect under pressure. As compression is lowered, the ball feels softer and is more prone to deform or change under pressure or impact forces. This additional "give" makes the core feel softer.

Traditionally, achieving this softer feel for a solid golf ball came at the expense of reduced COR. Recent developments in core materials, however, have enabled golf ball manufacturers to use materials having lower compression values while still achieving desired ball COR. In the past, it was not possible to obtain both a soft feel and acceptable COR.

Today, many golf ball manufacturers use solid core constructions in favor of wound ball constructions. The cores may be made of a single layer of material or may be formed from two or more layers of material.

Once the solid core is formed, additional layers of material may be formed around it by a wide variety of molding processes. Some examples of molding processes that might be used include injection molding, compression molding, casting, reaction injection molding, and the like. Many of these molding processes utilize high pressure to form a layer of material around a golf ball component. For instance, an injection molding process typically involves placing a golf ball component in a molding cavity and injecting layer material around the component under high pressure. Usually, the injection molded material is injected into the cavity around the core at a plurality of locations such that the material simultaneously exerts a force on the core at each location. Injection continues until the material covers the core and solidifies.

As the compression value of the core becomes lower, however, the core becomes more susceptible to deformation during molding. This deformation results in a non-uniform thickness of the molded layer. In the past, this phenomenon was not a significant factor to consider when molding around a solid core for at least two reasons.

First, the need for high compression materials in order to form cores with an acceptable COR meant that the core was much more resistant to deformation during molding of surrounding layers. As a result, the high compression core was less likely to deform significantly during the injection molding process.

Second, in the past the injection molded layer material often was relatively thick, i.e., about 0.080 inches for a "standard" cover layer and about 0.065 inches thick for a "thin" layer. Thus, any deformation exhibited by the core during molding would not result in a significant percentage variation in layer thickness. Moreover, skilled artisans avoided the practical difficulties of obtaining suitable layer thickness uniformity from injection molding thin layers simply by not making golf balls with thin layers.

Today, the trend in the golf ball industry is to use solid core materials having lower compression values and to mold one or more substantially thinner layers around it. In other words, both factors described above that helped mask the phenomenon of core deformation during molding additional layers under pressure no longer apply. Some golf balls with solid core constructions use core materials having low compression. Additionally, many ball constructions utilize considerably thinner molded layers than previously used in golf ball manufacturing. The injection molded casing, or inner cover layer, of the Titleist Pro V1, for instance, is 0.035 inches thick. Additionally, the use of larger diameter cores than used in the past also has led to thinner cover or intermediate layers.

As these design parameters push further toward even lower compression core materials and even thinner molded layers, however, the phenomenon of non-uniform molded layer thickness may become increasingly more significant because a softer, more elastic core will deflect more under the substantial pressure exerted on it during injection molding. The differences in layer thickness also can result in a considerable lack of uniformity on a percentage basis when the molded layer is thin. This percentage difference may become even more apparent as the desired thickness of the molded layer decreases.

In view of the current popularity in solid core constructions using materials with low compression values as well as the trend toward molding thin layers around the core, a continuing need exists for a reliable and efficient method of molding thin layers of material around a golf ball core or golf ball component having a low compression such that the molded layer has improved layer thickness uniformity.

SUMMARY OF THE INVENTION

The present invention is generally directed toward a method of making a golf ball by subjecting a component part or portion of the ball to low temperatures prior to molding additional layers around it.

One embodiment of the invention involves obtaining a golf ball core and cooling it before forming a layer around the core. In this embodiment, the core may be placed in a cooling unit for a predetermined amount of time in order to sufficiently lower the temperature of at least a portion of the core. After the core has been sufficiently cooled, it may be removed from the cooling unit and transferred to a mold for further processing. In one embodiment, the step of forming an additional layer around the cooled core begins from about 10 to about 50 seconds after the cooled core is placed in the mold.

In one embodiment of the invention, the core has a liquid center, while in another, more preferred embodiment, the core is solid. In one embodiment involving a core having a liquid center, the core may be sufficiently cooled to cause the liquid center to freeze. In yet another embodiment, the core comprises a semi-solid core.

Preferably, the present invention is used with solid cores. Solid cores may be made of one or more layers of material. In one embodiment, the solid core is cooled in a manner that it has substantially the same temperature throughout the core. For instance, in one embodiment the temperature at the center of the core is within 5° F. of the surface temperature of the core after the core has been cooled. Alternatively, the solid core may be cooled more rapidly or for a shorter duration so that the surface temperature of the cooled core is substantially lower than the temperature at the center. In one embodiment, for example, the temperature at the center of the core is more than 10° F. greater than the surface temperature of the core after it has been cooled. In other embodiment, the temperature difference between the center of the core and the cooled outer surface is more than 30° F.

The effective modulus of the core may increase as the core is cooled. In one embodiment, for example, the core is sufficiently cooled until the effective modulus of the core is increased from about 10 to about 20 percent of the effective modulus of a similar core at room temperature. Room temperature generally corresponds to a typical temperature of an environmentally controlled room, such as an office or workplace. Typically room temperature may be approximately 70° F. In another embodiment, the core is sufficiently cooled until the effective modulus of the core is increased from about 20 to about 30 percent above the effective modulus of the core at room temperature.

During the time that the cores are cooled, humidity in the surrounding environment may cause frost to accumulate on the surface of the core prior to molding. It is preferred either that frost or moisture is substantially prevented from accumulating on the core or that frost or moisture is substantially removed from the surface of the core prior to forming an additional layer around it. In one embodiment of the invention, the cores are cooled in a low-humidity environment. In one embodiment, the humidity of the environment in which the cores are cooled is substantially zero.

Once the core has been sufficiently cooled, an additional layer may then be formed around it. The additional layer of material may be formed around the core in any manner. In one embodiment, the additional layer is formed around the cooled core by an injection molding process, such as by retractable pin injection molding (RPIM).

The present invention also may be described by the temporary change in physical properties of the core as a result of cooling it. As described above, the core may be cooled in order to increase the effective modulus of the core to a particular level. The core also may be cooled until reaching another physical property. For example, in one embodiment of the invention the core is sufficiently cooled in order to reduce its elasticity. This can be achieved by subjecting the core to cooling by any of the processes described herein.

DETAILED DESCRIPTION OF THE PREFERRED EMBODIMENTS

A method of improved golf ball production is encompassed by the present invention. In a preferred embodiment, the method involves temporarily reducing the elasticity of the core or golf ball component prior to and/or during molding of the additional layer of material. More particularly, the present invention is directed toward an improved process for molding a golf ball layer over a golf ball core or other golf ball component. A golf ball core may be formed from one or more layers of core material, while a golf ball component may be any portion of the golf ball. For instance, a golf ball component may include a portion of a multilayer core, a completed core, a core and at least one intermediate layer, or a core and at least one inner cover layer of a golf ball. The embodiments also may be applied to only one or more specific types of golf ball components described above.

The elasticity of a golf ball core or component may be reduced by lowering its temperature, such as by subjecting the core or component to freezing temperatures for at least a predetermined amount of time. The temperature and duration of the freezing process may depend on the composition of the core, the conditions under which the additional layer will be formed (e.g., molding temperature, pressure, duration, and the like), or other factors that may cause the core or component to deform during the molding process.

Figure 1:
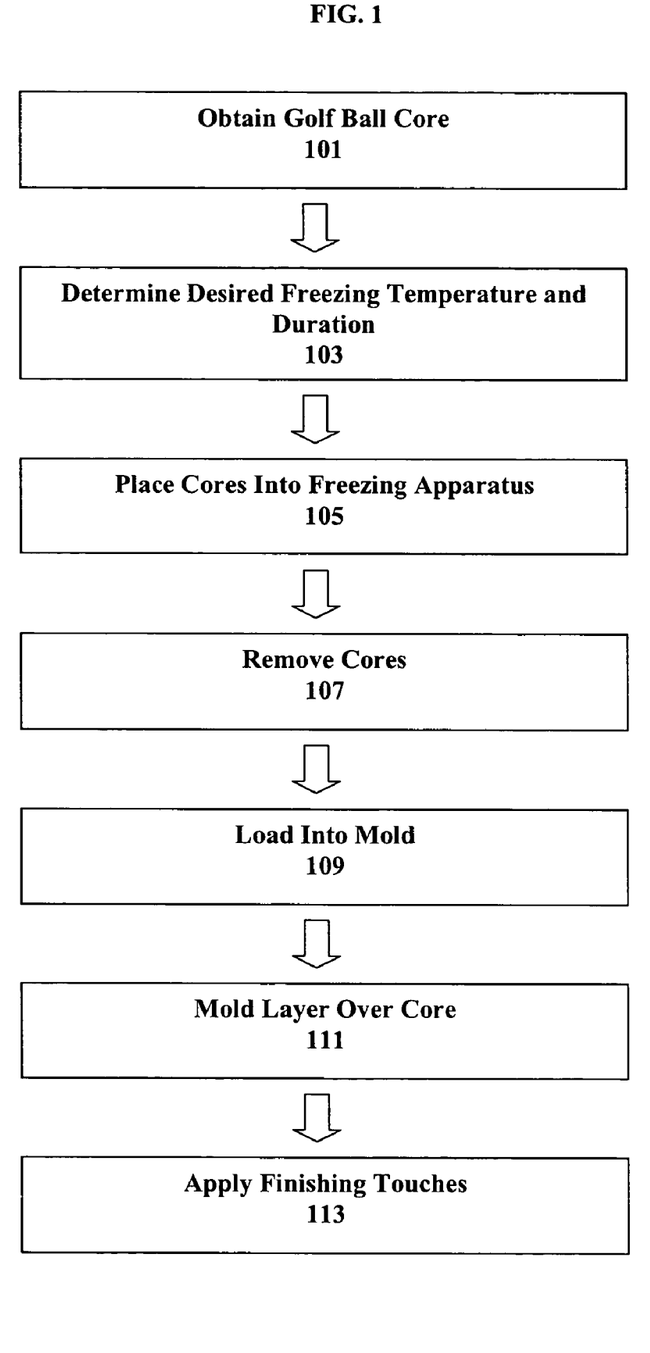
FIG. 1 is a diagram showing exemplary steps according to the present invention.

FIG. 1 is a diagram showing exemplary steps according to the preferred embodiment of the present invention. In a preferred embodiment, the present invention comprises obtaining a core or component 101.

Once the core or component has been obtained, a desired freezing temperature and duration 103 may then be determined. The core or component is then placed inside a freezing apparatus 105 at least until a portion of it has been reduced to a desired temperature. The freezing apparatus may be a low temperature bath, such as liquid nitrogen or the like where the cores may be rapidly cooled to a desired temperature. In some embodiments, explained more fully below, the temperature of only a portion of the core is reduced such that a surface shell or outer region of material is at a desired reduced temperature even though the center of the core may be at a higher temperature. For example, in one embodiment of the invention the core or component is subjected to a low temperature bath that lowers the temperature of the core or component to a desired temperature from the outer surface to a depth of at least about 0.05 inch toward the center. In another embodiment, the region or the core or component that is sufficiently cooled is from about 0.05 to about 0.25 inch deep. Alternatively, a region of the core or component ranging from about 10 percent to about 80 percent of the diameter of the core or component is cooled to a desired temperature before molding an additional layer of material around it.

In addition to rapidly lowering the temperature of the core or component, such as by submerging the core or component in a low temperature bath, the freezing apparatus also may lower the temperature of the core or component more gradually. For example, the freezing apparatus may be a refrigerated or chilled compartment where the cores may be placed for a more extended time in order to achieve a desired temperature. In one embodiment of the invention, the temperature of the core or component is lowered throughout substantially all of the core or component prior to molding an additional layer around it.

Once the core or component has been sufficiently cooled, it may be removed from the freezing apparatus 107 and loaded into a mold 109. In one embodiment, a Retractable Pin Injecting Molding (RPIM) method is used to form an additional layer around the frozen core or component 111. This method of forming a golf ball layer, already described generally herein, is well known to those skilled in the art. After the additional layer has been molded, the new layer may be subjected to additional processing and finishing 113. The additional finishing or processing of the molded layer may include, without limitation, removal of excess layer material formed by sprues or flash around the mold parting line, buffing of the mold parting line, the molding of more layers of material around the newly formed layer, painting, application of logos, numbers, or other indicia, or the like.

When the temperature of a solid core or component is sufficiently reduced for at least a portion of the core or component, the effective modulus of the material may be increased to sufficiently resist undesired deformation while molding an additional layer around the core or component. In other words, this causes the core to provide temporary increased resistance to deformation or squeezing during molding while later allowing it to return to its initial properties to provide a desired ball performance or feel. In a preferred embodiment, the frozen core reduces the need for conventional tooling and process that is typically necessary to compensate for the deformation of cores when molding additional layers around it under pressure.

In addition, as the temperature of a solid core or component is reduced, its diameter may shrink. This effectively temporarily increases the wall thickness of the additional layer during the molding process while allowing the molded layer to stretch and become thinner as the core or component increases in diameter as it thaws.

The solid core may be manufactured from any type of material known to those skilled in the art. The core may be shaped in any desired manner. In an exemplary embodiment, the core may be substantially spherical. In other embodiments, the core may have a slight elliptical, oblong, or out of round shape to account for some deformation that may still occur even after lowering the temperature of the core or component prior to molding the additional layer. The size and shape of a core may be varied as desired, and may depend on the process used to manufacture the golf ball.

The core or component may be manufactured out of any combination of materials. For example, metal, plastic, alloys, synthetic materials, etc., may be used to manufacture a core, a portion of the core, or one or more layers that make up the golf ball component. In addition, the core or component can be manufactured using any process known to those skilled in the art.

The present invention is not limited to the examples of the freezing apparatus described above. Instead, any method of freezing or cooling a core or component may be employed. In one embodiment, liquid nitrogen may be used to freeze a core or component. In other embodiments, other coolants and/or standard freezing apparatus known to those skilled in the art may be sufficient. The type of apparatus used to freeze a core may depend on the size and composition of the core. For example, the freezing apparatus employed may depend on the material properties of the material or materials that form the core or component. For instance, the freezing point may depend on the temperature necessary to cause the solid to contract or harden, thereby increasing its effective modulus.

Preferably, the time that a core or component is subjected to cooling is sufficient to reduce its diameter. For example, the diameter of a core or component may effectively be reduced from about 0.3 to about 5 percent as a result of cooling, while in another embodiment the core or component diameter is reduced by at least 5 percent. As previously discussed, a core or component need not be frozen or cooled completely to achieve this desired reduced diameter. In other embodiments, however, the core or component temperature is reduced substantially throughout its entire diameter. This can be achieved, for instance, either by exposing the core or component to reduced temperatures of the freezing apparatus for an extended duration.

As discussed above, lowering the temperature of at least a portion of the core or component also may allow the effective modulus of the material to be temporarily increased to a desired magnitude or percentage of normal effective modulus. The compressive modulus is the ratio of compressive stress to compressive strain below the proportional limit. The effective modulus is the compressive modulus at a certain temperature. As the temperature decreases, the effective modulus increases. Typically, the compressive properties (such as stress and strain) describe the behavior of a material when it is subjected to a compressive load. To determine the compressive properties, a specimen is typically placed between compressive plates. The specimen is then compressed at a uniform rate. The maximum load is recorded along with stress-strain data, which is then used to calculate the effective modulus of the specimen.

The magnitude of a desired effective modulus may depend on the process used to manufacture a golf ball. In an exemplary embodiment, a core or component may be cooled or frozen at a desired temperature, and for a duration that is sufficient to increase the effective modulus of the core or component by about 10 to about 20 percent greater than the effective modulus at room temperature. In another embodiment, the reduced temperature increases the effective modulus by about 15 to about 30 percent of the core or component's normal, i.e., room temperature, effective modulus. In yet another embodiment, the effective modulus may be increased by more than about 30 percent when the core or component is cooled.

In an exemplary embodiment, a core or component may be cooled or frozen at a desired temperature, and for a duration that is sufficient to increase the effective modulus of the core or component more than about 500 psi. In another embodiment, the effective modulus may be increased by more than about 1000 psi. In yet another embodiment, the effective modulus may be increased by more than about 2000 psi.

In one embodiment, the temperature of a core or component may be reduced to achieve a desired effective modulus. In one embodiment, the temperature of a core or component may be reduced to achieve a effective modulus between about 3000 and about 8000 psi. In another embodiment, the temperature may be reduced to achieve a effective modulus between about 4000 and about 7000 psi. In yet another embodiment, the temperature may be reduced to achieve a effective modulus between about 6200 and about 6800 psi.

In one embodiment, a single mold may be used to form a plurality of different golf balls or components. This may be beneficial, for example, for conserving manufacturing space or for lowering overall manufacturing costs. In such an embodiment, it may be desirable to have a plurality of differently sized cores and components fit into a single mold. For instance, a core may be formed from a mold having a mold cavity of a first diameter. The core may then be cooled or frozen, thereby reducing its diameter, and then returned to the mold where an additional layer of material may be molded around the core. This process may be used for golf ball components as well. It may be desirable to cool or freeze each differently sized core or component for a sufficient period of time, at a sufficient temperature, until each core attains the desired properties and/or size.

As stated above, it may be desirable to freeze a core or component until its effective modulus increases to a desired magnitude. This magnitude of the effective modulus may depend on a variety of factors, such as the size and composition of a core or the method used to manufacture the golf ball. In the example discussed in Table 1 below, for instance, the effective modulus is increased above 6,500 psi when the core or component is cooled.

In other embodiments, it may be preferable to freeze a core or component until its effective modulus is increased by a desired percentage. Preferably, the effective modulus of a frozen core increases between 5 and 40 percent. More preferably, the effective modulus of a frozen core increases between 8 and 30 percent, and most preferably between 10 and 20 percent.

Once the core or component is sufficiently cooled or frozen to a desired diameter and/or effective modulus, it is ready to have an additional layer molded around it. Thus, the core or component may be placed in a mold soon after it is removed from the freezing apparatus. In other embodiments, there may be a small time delay between removing the core or component from a freezing apparatus and molding an additional layer around it. For example, the time delay between removing a core or component from the freezing apparatus and placing it in the mold may be less than from about 10 to about 20 seconds. Likewise, the time delay may be less than from about 5 to about 15 seconds, and preferably may be less than from about 3 to about 7 seconds.

As the time period from the removal of the core or component from the freezing apparatus to the molding of the additional layer or layers increases, the desired temperature at which at least a portion of the core or component is initially reduced may be raised to account for thawing or warming of the core or component prior to molding the additional layer.

Preferably, water vapor is prevented from freezing or accumulating on the surface of the core or component prior to molding the additional layer. Thus, a dehumidification device may be used during and/or after lowering the temperature of the core or component. For example, the freezing apparatus may be equipped with a dehumidifier to help prevent moisture from freezing on the surface of the core or component prior to molding one or more additional layers around it. In other embodiments, the freezing apparatus may be located inside a larger dehumidified area, such as an environmentally controlled room.

When a frozen core is removed from the freezing apparatus, the low temperature of the core also may cause moisture and/or frost to accumulate on the surface. Once the core or component is sufficiently cooled, it may be transferred to a storage container equipped with a dehumidification device to help minimize or reduce the accumulation of frost or condensate on the surface. The accumulation of moisture also may be removed or reduced by other methods in addition to dehumidification. For instance, the core or component may be subjected to a burst of compressed air or the like in order to substantially or completely remove the collected moisture prior to molding an additional layer.

A dehumidifying chamber serves to prevent moisture and/or frost from accumulating on the surface of a core by removing substantially all of the humidity from a desired area. In a preferred embodiment, the dehumidifying chamber may enclose the freezing apparatus and other apparatus necessary to form a golf ball. Any dehumidifying method or apparatus known to those skilled in the art may be used. The dehumidifying chamber does not have to be a separate apparatus. In alternate embodiments, the dehumidifying function may be incorporated into another apparatus, such as the freezing apparatus. As will be appreciated by those skilled in the art, the method or apparatus used to dehumidify may be varied according to a particular application.

A core may be removed from a freezing apparatus using a variety of removal apparatus. In one embodiment, a clamp may be used to grasp a core and place it into a mold. In another embodiment, a scooping device may be used to remove a core from a freezing apparatus. Preferably, the device used to remove a core from a freezing apparatus does not appreciably increase the temperature of the frozen core before the additional layer is molded around it. For instance, the device may be configured such that handling of the core or component does not increase the temperature of the surface by more than about 5° F.

More preferably, the core or component temperature does not increase by more than 10° F. from the time it is removed from the freezing apparatus until the additional layer contacts the core or component. As mentioned above, the core or component also may be further reduced in temperature below that desired when molding the additional layer to account for increases in temperature after the core or component is removed from the freezing apparatus.

In some embodiments, the removal apparatus may be kept at a very low temperature. This temperature may be based on the temperature used to freeze a core. Alternately, this temperature may be based on a temperature that does not significantly increase the freezing temperature of a core. Preferably, the removal apparatus is kept within a 5 to 10 degree range of the temperature used to freeze a core. More preferably, the removal apparatus is kept within a 2 to 7 degree range of the temperature used to freeze a core. Most preferably, the removal apparatus is kept within a 0.5 to 1.5 degree range of the temperature used to freeze a core.

In some embodiments, a cooling apparatus may be incorporated into the removal apparatus. For example, when a clamp is used to remove cores, a cooling liquid may flow through the clamp in order to cool it. In other embodiments, the clamp may be constantly cooled inside a freezing unit. In other embodiments, the removal apparatus may include an insulating material. In these embodiments, the removal apparatus may not need to be cooled. As will be apparent to those skilled in the art, any removal apparatus may be used in accordance with the present invention.

In an exemplary embodiment, the method encompassed by the present invention may take place inside a cooled chamber. The size of the chamber should be sufficient to hold all of the apparatus required to hold, freeze, and remove a core or component. The temperature of the chamber is preferably sufficient to maintain the frozen temperature of the cores. Preferably, the chamber temperature is within a 5 to 10 degree range of the temperature used to freeze a core. More preferably, the temperature is within a 2 to 7 degree range of the temperature used to freeze a core. Most preferably, the temperature is within a 0.5 to 2 degree range of the temperature used to freeze a core. In one embodiment, the freezing apparatus and the molding apparatus are preferably located in a controlled environment, such as in an environment where the temperature and/or amount of humidity in the air can be controlled.

Preferably, a layer is molded around the chilled or frozen core or component soon after it is placed in the molding apparatus. Even when using a dehumidification device to reduce levels of water vapor in the air, a small amount of moisture may collect or accumulate on the core or component prior to closing the mold and forming the additional layer. To help minimize this, it is preferred that the molding process begin soon after the core or component is properly positioned in the mold. While frost and moisture may be undesirable in many molding applications, small amounts may have only slight adverse effects. Nevertheless, it remains desirable to reduce or prevent moisture accumulation prior to molding. One way to achieve this is by minimizing the time that may transpire between when the core or component is loaded into the mold and when the mold is closed. For instance, the time delay between placing the core in the molding apparatus and closing the mold to begin to forming the additional layer is less than from about 10 seconds to about 30 seconds. Preferably, the delay is less than from about 5 to about 20 seconds, and even more preferably it is less than from about 1 to about 10 seconds.

In other exemplary embodiments, other methods of forming a golf ball may be used. In embodiments where material is wound around a core, the time between removing the core from a freezing apparatus and winding the material around the core should be substantially short. When using other methods of forming a golf ball, the time between removing a core from a freezing apparatus and using the core to begin forming a golf ball should be substantially short. Preferably, this time is between about 10 seconds and about 3 minutes. More preferably, this time is between about 10 seconds and about 2 minutes. Most preferably, this time is between about 5 seconds and about 1 minute.

After the additional layer is formed, either by molding, winding, or another method, finishing touches may be performed on the golf ball. When forming a golf ball by winding, this may include placing a cover over the wound material. When using an injection molding or compression molding process, this may include smoothing, polishing, painting, and applying logos and colors. Additional layers also may be formed to complete the golf ball, either by using conventional molding processes or by using the present invention. Finishing processes may depend on the type of process used to form a golf ball. Any number or type of processes may be performed on a golf ball after additional layer material has been placed or formed around the frozen core or component.

As previously described, one or more layers may either be wound or molded around a core or component. Typically, these methods subject a core or component to high amounts of pressure or stress that cause deformation during molding or forming of the additional layer. Prior methods have had to take this deformation into account when determining the properties of a core, such as size and/or shape. However, in a preferred embodiment, a frozen core is able to resist substantial deformation that may result from these processes because of its increased effective modulus. This may reduce or substantially eliminate the need to modify the shape, size, or composition of a core according to the process used to form a golf ball. This may result in significant cost savings and other benefits known to those skilled in the art.

Compression values are dependent on the diameter of the component being measured. Atti compression is typically used to measure the compression of a golf ball. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J.

The Atti compression of the core, or portion of the core, of golf balls prepared according to the invention is preferably less than about 80, more preferably less than about 75. In another embodiment, the core compression is from about 40 to about 80, preferably from about 50 to about 70. In yet another embodiment, the core compression is preferably below about 50, and more preferably below about 25. In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

It is further preferred that the overall diameter of the core is large. For instance, the outer diameter of the core may be about 1.55 inches or greater, while in another embodiment the core diameter is about 1.58 inches or greater. In yet another embodiment of the invention, the core diameter is from about 1.58 to about 1.64 inches. The core diameter also may be from about 1.60 inches to about 1.62 inches. Without being bound to any particular theory, it is believed that the use of a soft, oversized core provides a desirable soft "feel" while also providing desired ball COR.

There is currently no USGA limit on the COR of a golf ball, but the initial velocity of the golf ball cannot exceed 250±5 feet/second (ft/s). Thus, in one embodiment, the initial velocity is about 245 ft/s or greater and about 255 ft/s or greater. In another embodiment, the initial velocity is about 250 ft/s or greater. In one embodiment, the initial velocity is about 253 ft/s to about 254 ft/s. In yet another embodiment, the initial velocity is about 255 ft/s. While the current rules on initial velocity require that golf ball manufacturers stay within the limit, one of ordinary skill in the art would appreciate that the golf ball of the invention would readily convert into a golf ball with initial velocity outside of this range. For example, a golf ball of the invention may be designed to have an initial velocity of about 220 ft/s or greater, preferably about 225 ft/s or greater.

As a result, of the initial velocity limitation set forth by the USGA, the goal is to maximize COR without violating the 255 ft/s limit. The COR of a ball is measured by taking the ratio of the outbound or rebound velocity to the incoming or inbound velocity. In a one-piece solid golf ball, the COR will depend on a variety of characteristics of the ball, including its composition and hardness. For a given composition, COR will generally increase as hardness is increased. In a two-piece solid golf ball, e.g., a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

The present invention contemplates golf balls having COR's from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815. A further discussion of COR is discussed in U.S. Pat. Nos. 6,443,858 and 5,846,141, which are incorporated by reference in their entireties.

Preferably, the COR of the core about 0.790 or greater prior to cooling, and more preferably about 0.800 or greater. While it is desirable to design a ball having a large diameter, soft compression core with a high COR, it is also preferred that the overall design of the ball does not exceed initial velocity limits established by the USGA. Thus, it is preferred that the initial velocity of the ball is about 255 ft/s or less, and more preferred that the initial velocity of the ball is from about 250 ft/s to about 254.9 ft/s.

Once the core or component has been formed, a thin layer may then be molded around it. As mentioned previously, the process used to mold the additional layer around the core or component may vary, and may include compression molding, injection molding, or other well-known molding processes. It is believed that the present invention may be of particular benefit when injection molding a thin layer around the core or component.

As previously explained, when a soft core or component is subjected to pressure when molding an additional layer around it, its shape can deform and cause the molded layer to be uneven or incomplete. Deformation of the core or component can cause the layer molded around it to lack uniformity. Moreover, when the desired thickness of the molded layer is very thin, deformation of the core or component can cause a portion of the core or component to contact the mold cavity wall and obstruct flow of layer material around the core or component. As explained above, prior golf ball designs having soft compression solid cores have not been presented with these adverse effects because the molded layer typically is very thick, such as being greater than 0.070 inches.

In contrast, the present invention allows a very thin layer to be molded around the core or component. For instance, the thickness of the molded layer may be about 0.050 inches or less, while in another embodiment the thickness is about 0.040 inches or less. In yet another embodiment, the molded layer is about 0.030 inches or less.

The layer formed around the cooled core or component may form different portions of the golf ball. In one embodiment, the layer formed around the core or component is an additional core layer. The additional layer formed around the core or component also may be an intermediate layer or a cover layer.

If the additional layer formed around the core or component is a cover layer, the material used to form the layer may comprise, without limitation, polyurea, polyurethane, ionomer resins, or the like. Other cover materials known to skilled artisans also may be used with the present invention. When the additional layer is formed from an injection molding process, it is preferred that the material is thermoplastic.

The additional layer also may be one of many layers that form a portion of a golf ball. For instance, the additional layer may form an inner cover layer, an outer cover layer, or one of many laminated intermediate layers. The present invention may also be repeated two, three, or more times during the manufacture of a golf ball in order to aid in forming multiple thin layers on the ball.

While it is believed that the present invention allows the molded layer to be significantly thinner than previously possible, other practical considerations may nevertheless limit the thickness of the molded layer. For example, the layer thickness should be sufficiently thick to permit the layer material to flow around the core or component in order to form the layer. Thus, the molded layer for any of the embodiments described above may be about 0.005 inches or greater, and more preferably may be about 0.01 inches or greater.

The following examples shown in Table 1 illustrate how the present invention may help improve the process of molding an additional layer around a core or golf ball component.

TABLE 1

| Core Temperature | Room Temperature | Frozen @ −32 F. for 3 hrs |
|---|---|---|
| CORE | | |
| NP (in) | 1.550 | 1.536 |
| EQ (in) | 1.551 | 1.537 |
| OOR ($10^{-3}$ in) | 1.7 | 2.6 |
| Effective Modulus (psi) | 5841 | 6541 |
| MOLDED GOLF BALL COMPONENT (Measured at Room Temperature) | | |
| NP (in) | 1.619 | 1.636 |
| EQ (in) | 1.627 | 1.636 |
| OOR ($10^{-3}$ in) | 8.2 | 1.5 |

Table 1 compares a golf ball component manufactured using room temperature cores and frozen cores. Table 1 shows the pole to pole (NP) diameter, the diameter at the equator (EQ), and the out of round (OOR) diameter of a golf ball core and a molded golf ball. Measurements are shown for cores that are at room temperature, and for cores that are frozen. In the example, the cores are frozen at −32 degrees Fahrenheit for three hours.

The OOR diameter of a golf ball is a measurement that describes the diameter of a core that is deformed from its substantially spherical condition. This measurement is well known to those skilled in the art. Typically, it is desirable to have the OOR diameter as low as possible. A ball that has a high OOR diameter has reduced thickness at the poles of the ball. When manufacturing golf balls, this results in a lopsided ball, which is undesirable.

In the exemplary table, a core with a 1.550 inch NP diameter is used. When the core is frozen, its NP diameter shrinks to 1.536 inches. Similarly, the EQ diameter of the room temperature core is 1.551 inches. This diameter shrinks to 1.537 in a frozen core. In this exemplary embodiment, the OOR diameter increases from 1.7 inches to 2.6 inches. However, the effective modulus increases from 5841 psi to 6541 psi.

Table 1 also shows the results of a ball that is molded using both the room temperature and the frozen core. After a molding layer has been formed over the room temperature core, its NP diameter is 1.619 inches. This is compared to the frozen core, which has a NP diameter of 1.636 inches. The EQ diameter of 1.627 inches for the room temperature core is slightly smaller compared to the 1.636 inch EQ diameter of the frozen core. However, the OOR diameter of the room temperature ball is 0.0082 inches. This is larger than the 0.0015 inch OOR diameter for the frozen core.

In the example shown in Table 1, the diameter of the frozen core decreased compared to the room temperature core. In addition, the effective modulus of the frozen core increased compared to the room temperature core. While a frozen core formed a ball that has a slightly larger NP and EQ diameter, the decrease in the core diameter and increase in effective modulus form a molded golf ball that has a reduced OOR diameter. Minimizing the OOR diameter is highly desirable when forming golf balls.

Figure 2:
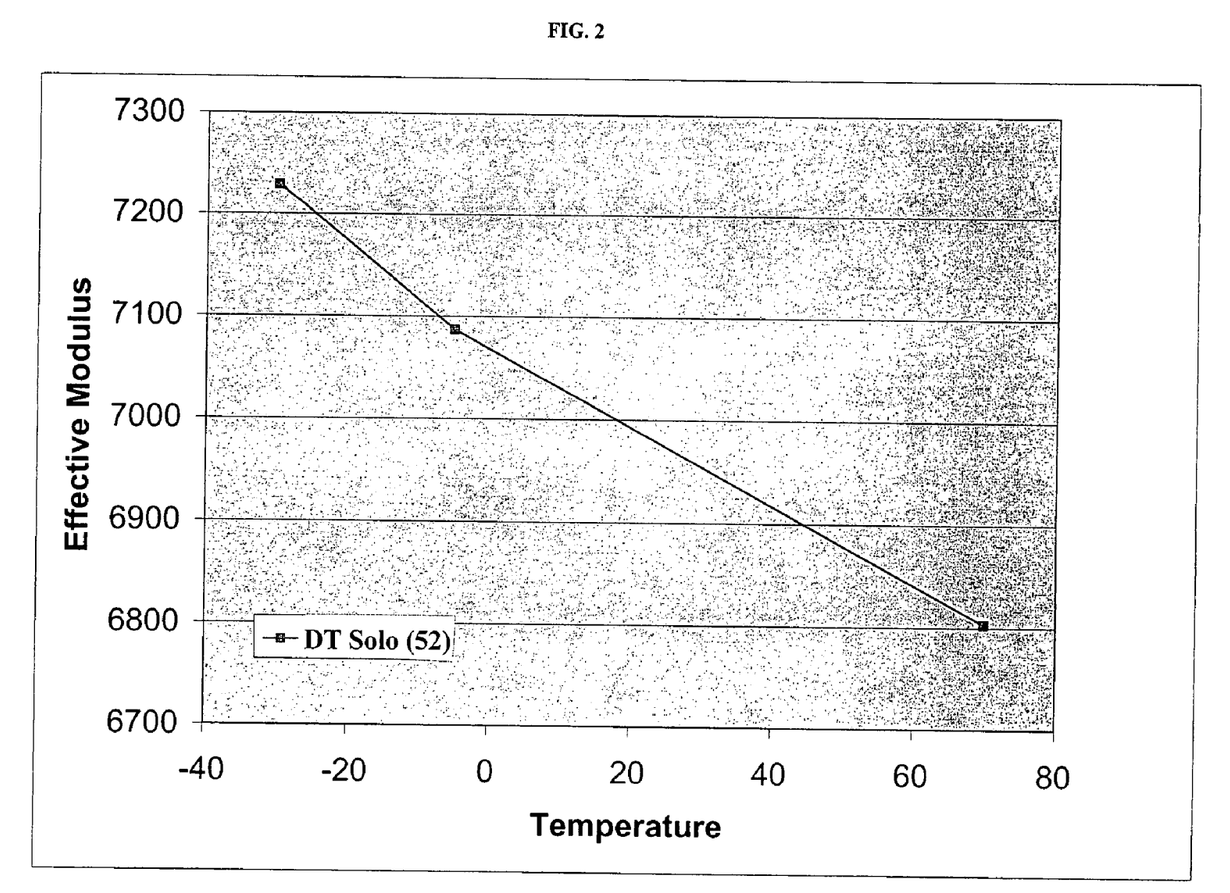
FIGS. 2–4 are graphs showing the effective modulus versus temperature of a Titleist Solo, ProV1, and NXT, respectively.
Figure 3:
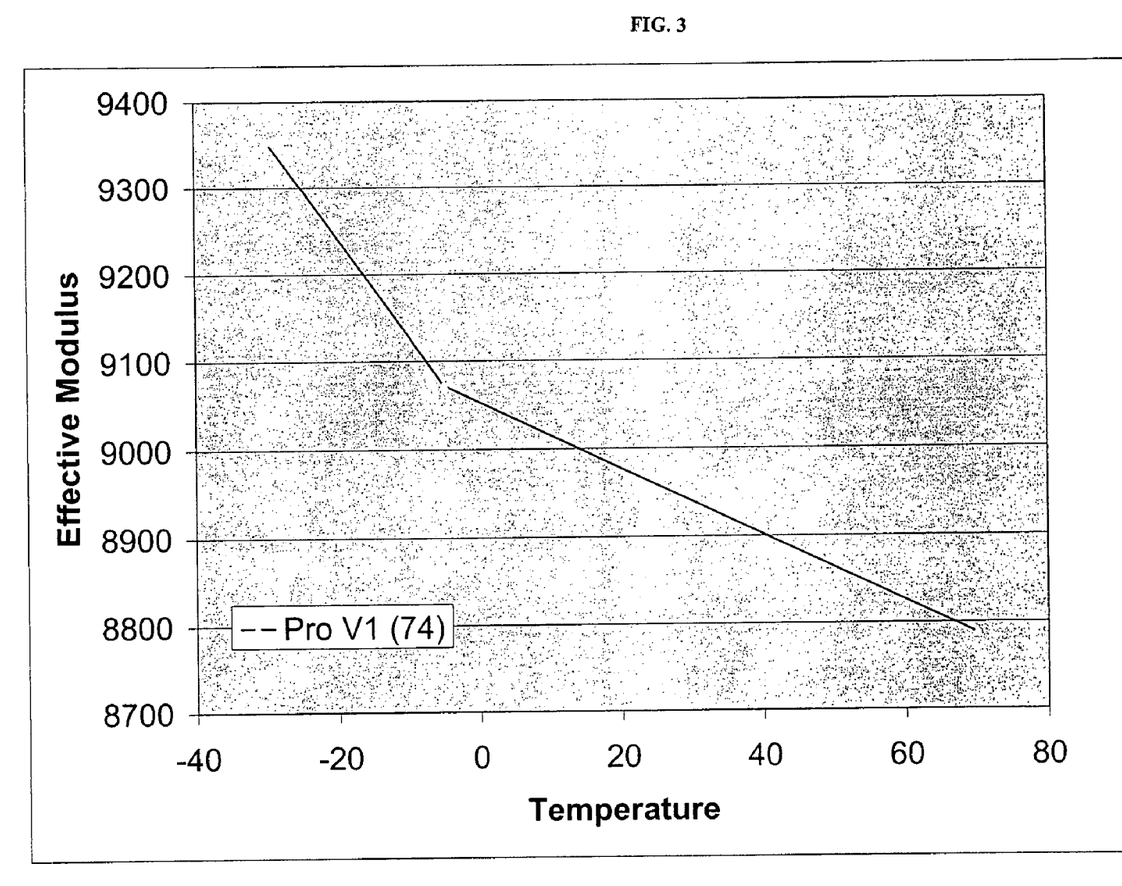
Figure 4:
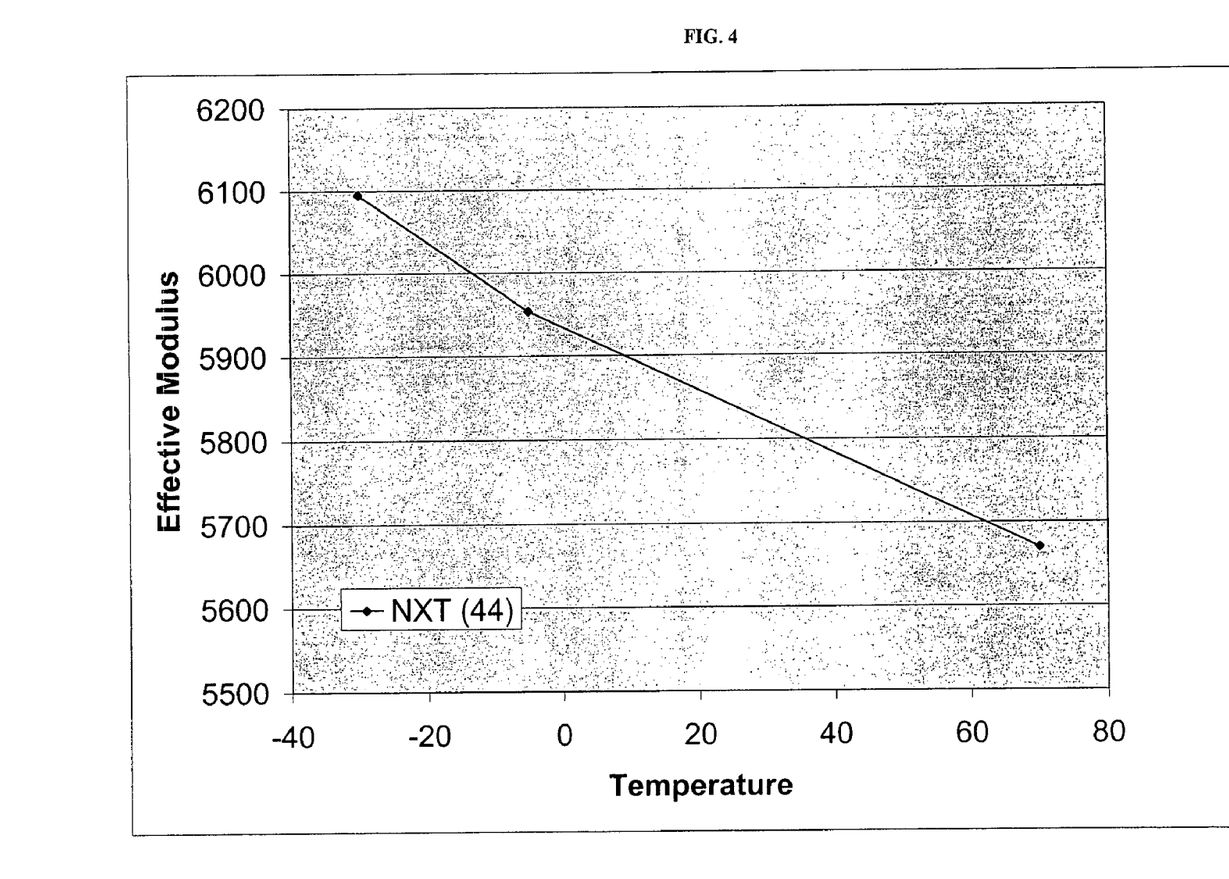

In one embodiment, one or more different cores or components may be frozen according to the description above. For example, a Titleist DT Solo, ProV1, or NXT core or component may be frozen and tested according to the present invention. In such an embodiment, each core or component may be cooled to a desired temperature. The effective modulus may be measured and recorded. This may then be repeated for a desired number of increasingly lower temperatures, as shown in FIGS. 2–4. The results may then be graphed, thus providing a graphical representation of the effect of temperature on the effective modulus of a particular core or component.

In some embodiments, a golf ball manufacturer may have determined the amount of pressure that a core or component may be subjected to during the golf ball molding process. Based on the pressure, the manufacturer may be able to determine the effective modulus that is necessary to prevent substantial deformation of a core or component. Using the graphs shown in FIGS. 2–4, a manufacturer may use the desired effective modulus to determine the temperature that is necessary to obtain that effective modulus for a particular core or component. The effective modulus is not the only property of a core or component that may be measured. In other embodiments, other properties such as the compression as a function of temperature, may be useful.

Though the preferred embodiment of the present invention has been described with reference to golf ball formation, it will be apparent to those skilled in the art that the present invention may also be applied in other fields, such as in the manufacture of other types of balls. For example, the present invention may be used in the formation of any type of ball that uses a solid core, such as a baseball. More specifically, the present invention may be of use in forming thin layers around a solid core or component of a ball where deviations in layer thickness are more readily noticed and may have a greater adverse effect on ball performance.

Although the present invention has been described with reference to particular embodiments, it will be understood to those skilled in the art that the invention is capable of a variety of alternative embodiments within the spirit of the appended claims.

The invention claimed is:

1. A method for manufacturing a golf ball, comprising:
   obtaining a solid core having a compression of about 75 or less;
   cooling said core, wherein said core has a first effective modulus at room temperature, and wherein said cooling step causes the core effective modulus to increase by about 5 to about 40 percent; and
   forming a thin layer of material around the cooled core;
   wherein a time delay between cooling said core and forming the thin layer is between about 10 and about 30 seconds.

2. The method of claim 1, wherein said core has an outer diameter of about 1.55 inches or greater.

3. The method of claim 2, wherein the step of forming a thin layer or material around the core comprises placing the core in a mold and injection molding layer material around the core.

4. The method of claim 3, wherein the injection molded layer material contacts the cooled core from about 10 to about 50 seconds after said cooled core is placed in said mold.

5. The method of claim 1, wherein said core has a first diameter at room temperature, and wherein said cooling step causes the core diameter to be reduced from about 0.3 to about 5 percent prior to forming said thin layer of material around the core.

6. The method of claim 1, wherein said core has a first effective modulus at room temperature, and wherein said cooling step causes the core effective modulus to increase above about 3,000 psi.

7. The method of claim 1, further comprising the step of using a dehumidification device to reduce the accumulation of moisture on the cooled core.

8. The method of claim 1, further comprising the step of substantially removing moisture from the surface of the cooled core prior to forming the thin layer.

9. The method of claim 2, wherein said core has a COR of about 0.790 or greater at an inbound velocity of 125 ft/sec prior to cooling.

10. A method for manufacturing a golf ball, comprising:
    obtaining a solid golf ball component;
    cooling said golf ball component, wherein said golf ball component has a first effective modulus at room temperature, and wherein said cooling step causes the component effective modulus to increase by about 5 to about 40 percent; and
    forming a thin layer of material around the cooled component;
    wherein:
    the time between cooling the golf ball component and forming the thin layer is between about 5 and 20 seconds;
    the diameter of said golf ball component is reduced by at least 5%; and
    wherein the surface temperature of the golf ball component does not increase by more than 5° F. between the cooling and the forming.

11. The method of claim 10, wherein the cooling is achieved using liquid nitrogen.

12. The method of claim 10, wherein the surface temperature of the golf ball component does not increase by more than 10° F. between the cooling and the forming.

13. The method of claim 1, wherein the diameter of the core is reduced by at least 5%.

14. The method of claim 1, wherein the cooling is achieved using liquid nitrogen.

* * * * *